FIG_1_

FIG_2_

FIG_3_

INVENTOR.
Anton Dresden.

FIG_4_

March 9, 1965 A. DRESDEN 3,172,192
METHOD OF MANUFACTURE OF VALVE CONSTRUCTION
Filed Dec. 19, 1960 11 Sheets-Sheet 4

FIG. 5.

INVENTOR.
Anton Dresden.
BY
ATTORNEYS.

FIG_7_

FIG_8_

March 9, 1965 A. DRESDEN 3,172,192
METHOD OF MANUFACTURE OF VALVE CONSTRUCTION
Filed Dec. 19, 1960 11 Sheets-Sheet 8

INVENTOR.
Anton Dresden.
BY
ATTORNEYS.

FIG_11_

March 9, 1965 A. DRESDEN 3,172,192
METHOD OF MANUFACTURE OF VALVE CONSTRUCTION
Filed Dec. 19, 1960 11 Sheets-Sheet 10

FIG_12_

FIG_13_

INVENTOR.
Anton Dresden.
BY
ATTORNEYS.

March 9, 1965  A. DRESDEN  3,172,192
METHOD OF MANUFACTURE OF VALVE CONSTRUCTION
Filed Dec. 19, 1960  11 Sheets-Sheet 11

FIG_14_

FIG_15_

INVENTOR.
Anton Dresden.
BY
ATTORNEYS.

United States Patent Office 3,172,192
Patented Mar. 9, 1965

3,172,192
METHOD OF MANUFACTURE OF VALVE
CONSTRUCTION
Anton Dresden, Lake Grove, Oreg., assignor to Guy F.
Atkinson Company, San Francisco, Calif., a corporation of Nevada
Filed Dec. 19, 1960, Ser. No. 76,828
5 Claims. (Cl. 29—157.1)

This invention relates generally to valves of the ball type suitable for controlling fluid flow, and to methods for manufacturing the same.

Conventional valves of the above type make use of a rotatable ball-like valve member disposed within a valve body, and rotated 90° between full open and closed positions. In full open position a port through the valve member registers with the body passages, while in full closed position valve working surfaces on the valve body engage and form a seal with respect to valve working surfaces on the valve member. Ball valves of the larger sizes are generally constructed with the bodies and the balls made of cast metal, such as cast iron, semisteel or steel. The finished ball in the assembled valve is of such dimensions that it cannot be removed through the valve passages. Therefore it has been common either to construct the valve body in two or more parts which are secured together during assembly, or to provide a bonnet of such size that the ball may pass through the bonnet opening. Davis 2,809,011 shows a two part valve body in which the parts are flanged and bolted together. Such a construction is relatively expensive, due to its weight, the machining required, and labor involved during assembly. Valve bodies with large bonnets are likewise relatively expensive due to the weight of the metal parts and the machining required.

Aside from the above, one type of sealing means used for the larger sized ball valves is shown in the above mentioned Davis Patent 2,809,011. In general a pair of annular metal seal members are employed, which are adjustably attached to opposite sides of the ball. The valve working surfaces on the seal members are adapted to have seating contact with valve working surfaces formed on the valve body, in annular areas surrounding the body flow passages. The seal members are accessible for adjustment through the body passages, thus facilitating assembly of such a valve with proper sealing contact. In addition, the annular seal members are made flexible and proportioned to provide pressure areas exposed to the body pressure. When the valve is closed and an upstream pressure applied, fluid pressure acts upon the downstream sealing member and urges it toward the corresponding valve working surface on the body. The sealing means disclosed in said Patent 2,809,011 require the adjustment of a plurality of threaded nuts or like members, during assembly, to bring the valve working surfaces into proper relationship. While this is feasible, it requires considerable skill and is time consuming.

In general it is an object of the present invention to provide a novel ball valve construction which has a single piece integral cast body.

Another object of the invention is to provide a ball valve construction which makes possible the casting of both the body and the ball parts in one integral piece.

Another object of the invention is to provide a novel method of manufacture for a ball valve having cast metal body and ball parts.

A further object of the invention is to provide a new article of manufacture, namely a single integral casting comprising both the body and ball parts of a ball valve, and which is adapted to be machined to provide completely finished parts.

Another object of the invention is to provide a novel ball valve construction having a sealing means constituting an improvement on the sealing means disclosed in said Patent 2,809,011, particularly with respect to the manner in which the sealing members are adjustably carried by the ball.

Another object of the invention is to provide a ball valve construction which makes possible the replacement of both the sealing means carried by the ball and the sealing means carried by the body without the need of dis-assembling the body.

Another object of the invention is to provide a ball valve construction which makes possible a close alignment of the sealing members carried by the ball and by the body by allowing both the body and the ball to be machined as a unit, thus reducing the number of accumulative tolerances.

Another object of the invention is to provide a ball valve construction which permits the body bushings to be replaced without the need of disassembling the body.

Further objects and features of the invention will appear from the following description in which the preferred embodiment has been set forth in detail in conjunction with the accompanying drawing.

Referring to the drawing.

Figure 1:
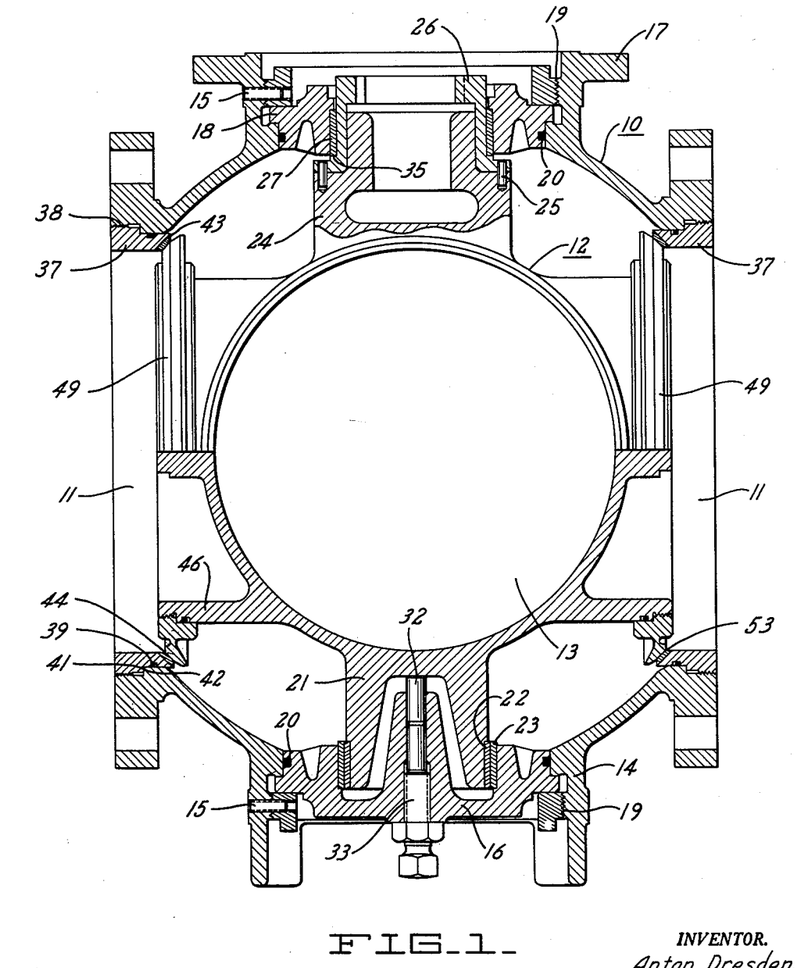
FIGURE 1 is a side elevational view in section illustrating a ball valve made in accordance with the present invention.
Figure 2:
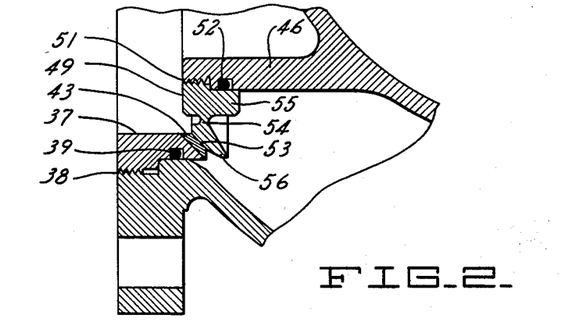
FIGURE 2 is a detail in section on an enlarged scale showing the sealing means.

The valve illustrated in FIGURES 1 and 2 consist generally of a body 10 having aligned flow passages 11 for making connection with associated piping. Within the body there is a rotatable valve member 12 which is in the form of a ball, although the shaping may depart somewhat from that of a sphere. As will be presently explained in detail, both the body and the valve member are made of cast metal, such as cast iron, semi-steel, or steel. The valve member is provided with a port or opening 13 which registers with the passages 11 for full open position.

The body caries suitable trunnion means for journaling the ends of the valve ball. Thus the end portion 14 of the body is shown bored to accommodate the trunnion member 16. The other flanged end portion 17 of the body is bored to accommodate the trunnion member 18. Members 16 and 18 are retained by threaded lock rings 19 and are sealed by suitable means such as the resilient O-rings 20. Lock rings 19 are held against rotation by setscrews 15. A stud shaft 21 is formed on the lower end of the valve ball, and carries a journal bushing 22 that is rotatable within a bushing 23 that is carried by trunnion member 16. The upper end of the valve ball is provided with a stud shaft 24, to which a drive sleeve 26 is secured as by dowels 25. The drive sleeve 26 is journaled within a bushing 27 that is mounted within the trunnion member 18.

Suitable means such as an operating shaft (not shown) is connected to the drive bushing. Also the flanged portion 17 serves to mount suitable bonnet means (not shown) which is sealed with respect to the shaft by suitable means such as a packing gland or a seal of the resilient O-ring type.

Means is provided to restrict axial movement of the valve ball. Thus the lower end of the ball engages a thrust pin 32 which is carried by the trunnion member 16 and which can be adjusted by the screw 33. At the upper end of the assembly a thrust bearing is formed by the annular shoulder 35 on the drive sleeve 26, which engages the lower end portion of bushing 27.

In my preferred construction valve working surfaces are formed on the removable seat rings 37. Each of these rings may have a threaded engagement 38 with the body, and is sealed with respect to the body by suitable means such as the resilient O-ring 39. Shoulders 41 and 42 formed on the seat ring and body respectively, provide convenient means for locating each seat ring in its normal position. The inner end of each seat ring can be provided with an overlay or facing 43, of suitable wear resisting metal, and this facing forms the valve working surface 44. The valve working surface conforms to a section of a sphere having the center of the ball as the center of the ball as the center of its radius. If desired the seat rings can be made entirely of wear resisting non-corrodible metal or metal alloy and the facing 43 omitted.

The valve member is provided with aligned annular ribs 46, the common axis of which is at right angles to the axis of the port opening 13. These ribs form means for mounting the ball seal members. As shown in FIGURE 2, each seal member is in the form of a metal ring 49, which may be a suitable machined casting. This ring is attached to the annular rib 46 by means of a threaded connection 51, and is sealed by suitable means such as the resilient O-ring 52. It is machined to provide the valve working surface 53 which is adapted to cooperate with the valve working surface 44 on the stationary seat ring 37. An annular portion 54 of this ring is of reduced wall thickness, to provide a limited amount of spring or resiliency. This portion is formed between the inner rigid collar portion 55, which is threaded for mounting on rib 46, and the outer rigid rim portion 56, on which the valve working surface is formed.

It will be noted from FIGURE 1 that the valve member is dimensioned whereby it cannot be removed from the valve body. As will be presently explained this is made possible by a novel manufacturing method, wherein the body and ball parts are formed as a single integral casting, and thereafter by a series of machining operations, the ball and body parts are completely machined, with the valve member within the body.

Assuming that all of the essential machining operations have been completed, the trunnion members are applied to the ends of the ball in the manner illustrated in FIGURE 1. The center line of the valve member passage 13 is set at 90° to the center line of the passages 11. The seal members 49 are mounted on the valve member by engaging the threaded connections 51, after which the seat rings 37 are inserted in the portion 38 of the body. It is assumed that the seal members 49 have been applied to the valve member in such a manner that after positioning the seat rings 37 within the body, the valve working surfaces are separated by substantial clearances. With the valve member in closed position suitable jacking means is applied to urge the valve member against the restraint of the trunnions and toward one of the passages 11. The seal member toward which the valve member is being urged is now turned on the threaded connection 51 to advance its valve working surface 53 toward the surface 44 until these surfaces come into light but direct contact. This seal member is now fixed with respect to the annular rib 46, as by means of dowels or setscrews. There is sufficient tolerance in the threaded connection 51 whereby the contact between the valve working surfaces is evenly distributed throughout the entire periphery of the seal member. Thereafter the valve member is jacked toward the opposite direction, and the other seal member 49 adjusted to bring the associated valve working surfaces into like physical sealing contact.

Assuming that the valve has been assembled in the manner described above, it is in condition for normal service. When the valve member is in closed position, and a working pressure applied to the upstream passage 11, a seal is maintained on the downstream side by virtue of the direct physical contact between the valve working surfaces. The body pressure corresponds to the pressure in the upstream pasage and is applied to the downstream seal ring. Due to the inherent spring of portion 54, the applied pressure differential increases the forces between the valve working surfaces. When no pressure differential is being applied to the valve, the ball readily turns from closed to open positions, because there is a minimum amount of drag between the valve working surfaces. When working pressure differential is applied, turning of the valve between closed and open poistions does not reqiure excessive torque because the only pressure differential tending to urge the valve working surfaces together is by virtue of the limited fluid pressure area presented by the downstream seal member. In other words only a relatively small pressure area is effective to urge the vlave working surfaces together, because the thrust of the valve member itself is taken by the trunnions. When turning has proceeded sufficiently far to permit initial fluid flow, the pressure differential across the downstream seal ring is reduced, and this together with the natural spring of portion 54 serves to reduce loading between the valve working surfaces, thus permitting continuous movement with a minimum amount of frictional drag. In addition to facilitating turning of the valve member, the greatly reduced load between the valve working surfaces makes for reduced wear, with the result that servicing is minimized and the useful life of the valve extended.

It will be evident from the foregoing that the sealing means descirbed has certain inherent advantages, particularly in comparison with the sealing means descirbed in said patent No. 2,809,011. When the sealing member is being adjusted during assembly of the valve, it is only necessary to turn the ring itself, whereby the valve working sufaces are brought into proper physical contact. With sealing means of the type disclosed in said Patent 2,809,011, it is necessary to adjust a plurality of members which serve to mount each seal ring upon the ball, and such adjustments must not only be carried out to advance or retract the seal member from the stationary valve working surface, but in addition must adjust the seal ring for uniform contact entirely about its circumference.

Figure 3:
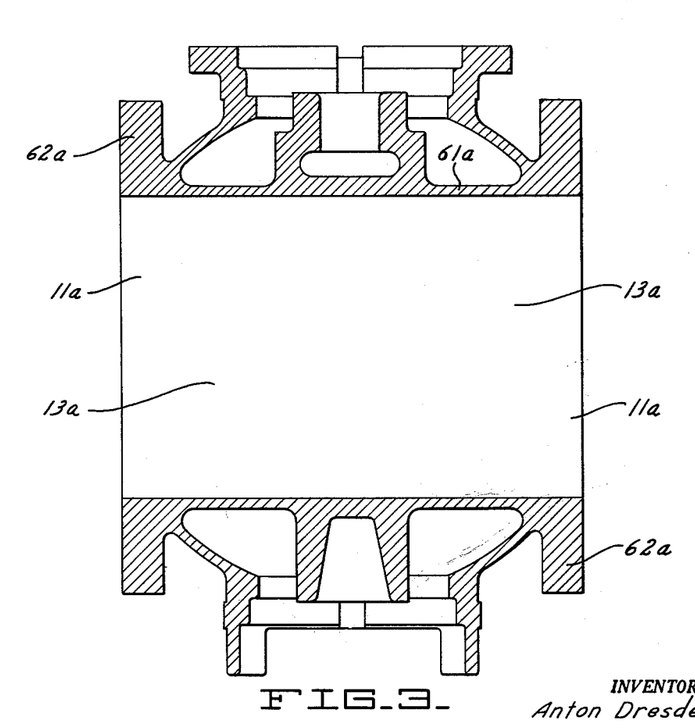
FIGURE 3 is a side elevational view in section showing an integral casting made in accordance with the invention and which is machined to form both the ball and body parts.
Figure 4:
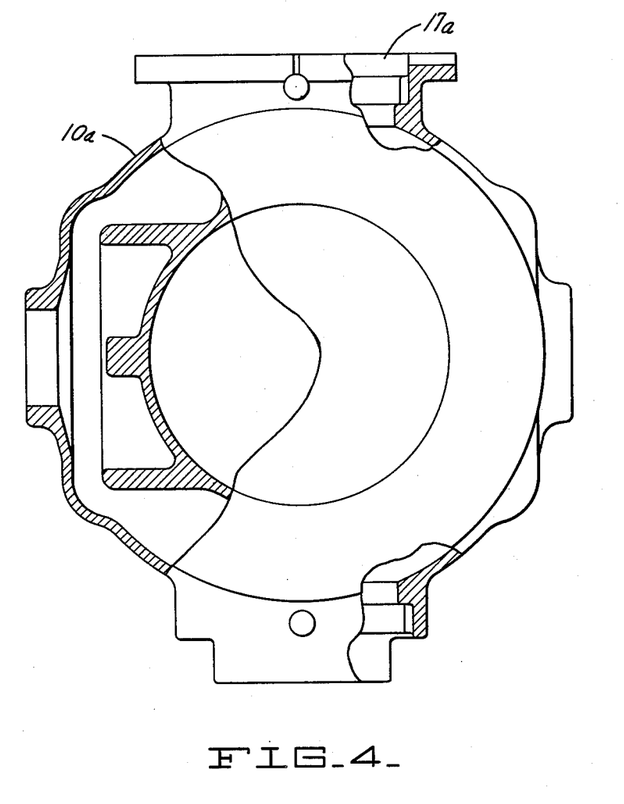
FIGURE 4 is a side elevational view partly in section showing the same casting as in FIGURE 3, but turned 90° about a vertical axis.
Figure 5:
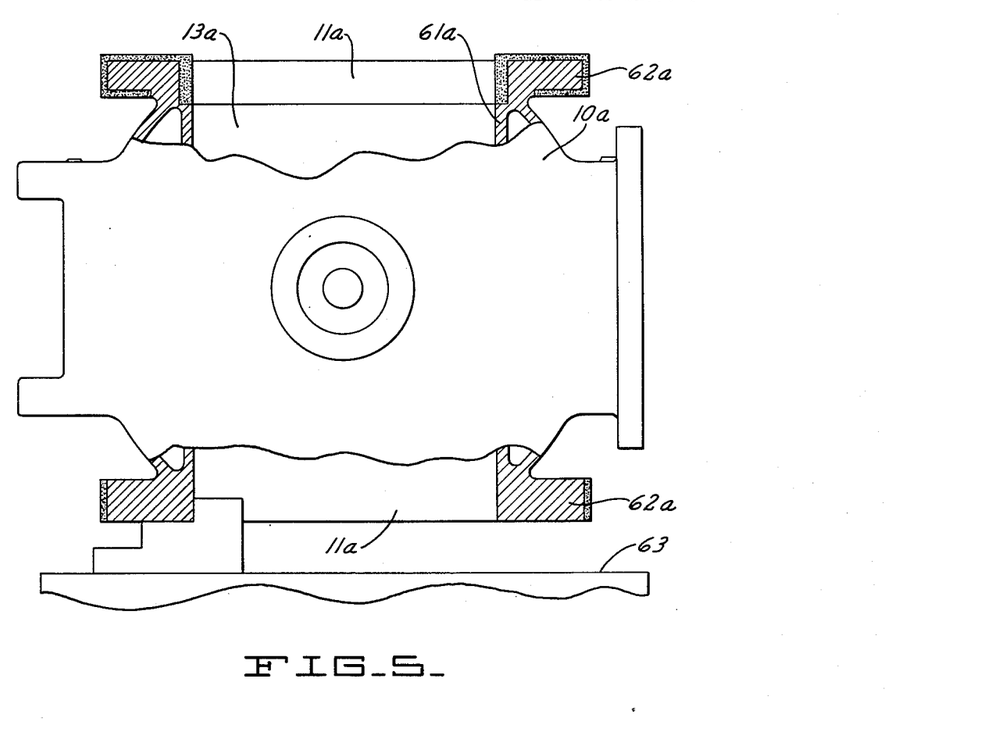
FIGURE 5 is a side elevational view partly in section and indicating an initial phase in the machining operations.
Figure 6:
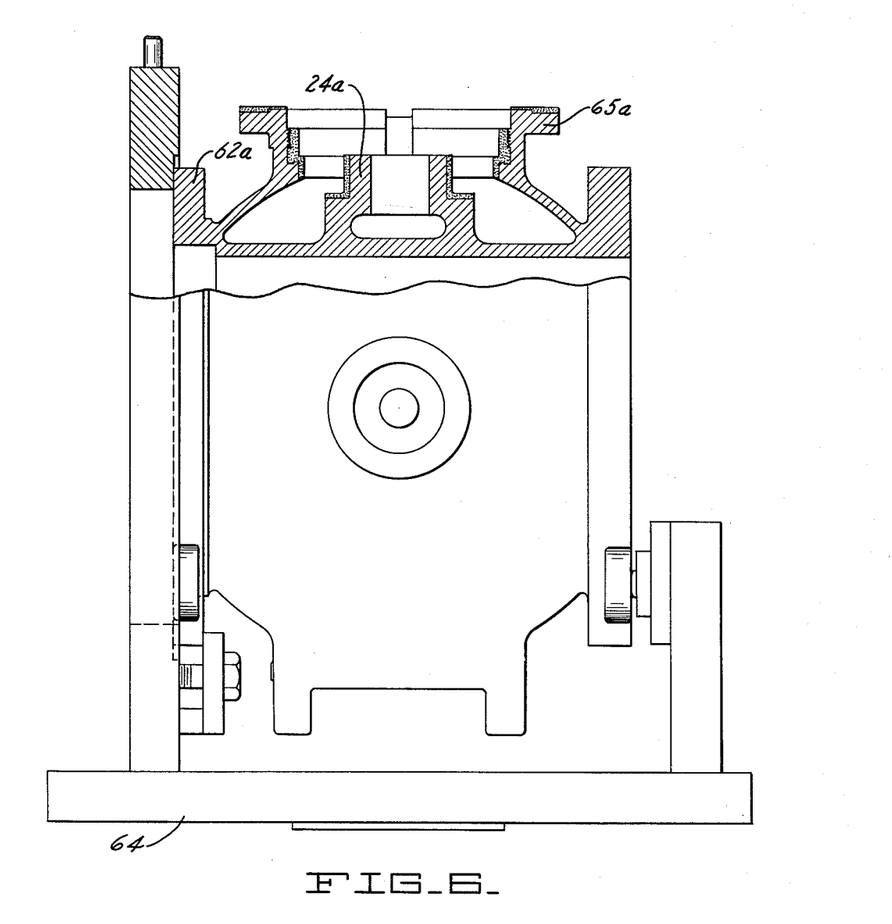
FIGURE 6 is a side elevational view but with the casting turned 90° about a horizontal axis from the position shown in FIGURE 5, the casting in this instance being attached to a fixture, and parts being broken away to indicate further machining operations.
Figure 7:
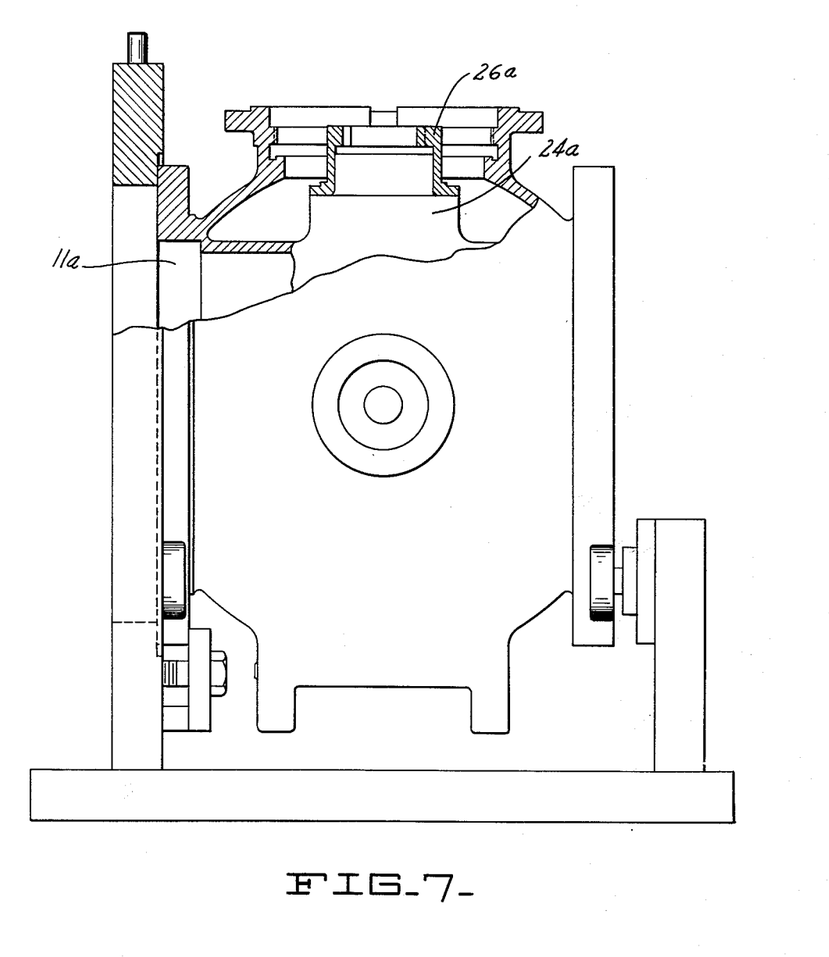
FIGURE 7 is a view like FIGURE 6 but showing a further phase in the machining operations and the application of a driving sleeve.

My method for the manufacture of the above valve is as follows: A single casting is made in accordance with FIGURES 3 and 4. In these figures the parts of the casting which correspond with the finished parts of FIGURE 1, have been given like designating numerals, but with the addition of the letter *a*. The annular wall portions 61a of the valve member which serve to define the port 13a through the valve member, are integrally joined with the body in regions adjacent the flange portions 62a, which surround the body flow passages 11a. By application of known foundry techniques, such a casting can be made of suitable metal such as cast iron, so-called semisteel, or steel. The dimensions are such as to provide sufficient metal for removal in the required machining operations. In the operation illustrated in FIGURE 5, the body is applied to a turning chuck 63 for machining certain surfaces thereby to provide locating surfaces for subsequent machine operations. Particularly, in FIGURE 5 the upper flanged end of the body and the periphery of the lower flange are machined as indicated by the shaded areas. After these preliminary operations, the casting is secured to a jig 64 as in FIGURE 6, with the top end of the body being uppermost. As indicated by the shaded areas, the flanged portion 65a is machined, together with the stud portion 24a of the ball. As shown in FIGURE 7, after the machining operations indicated in FIGURE 6, the driving sleeve 26a is fitted upon the machined stud 24a. Thereafter the entire assembly is turned to a position 90° from that shown in FIGURE 7, the rotation being about the axis of the passages 11a. As indicated by the shaded portions in FIGURE 8, machining operations are now carried out to bore and thread the opening 66a, and the machined stud 67a upon the ball. Stud 67a is machined to be concentric with the machined bore 66a. After so machining the upper portions, the assembly is rotated through 180°, and the same operations repeated for the other side of the assembly.

Figure 8:
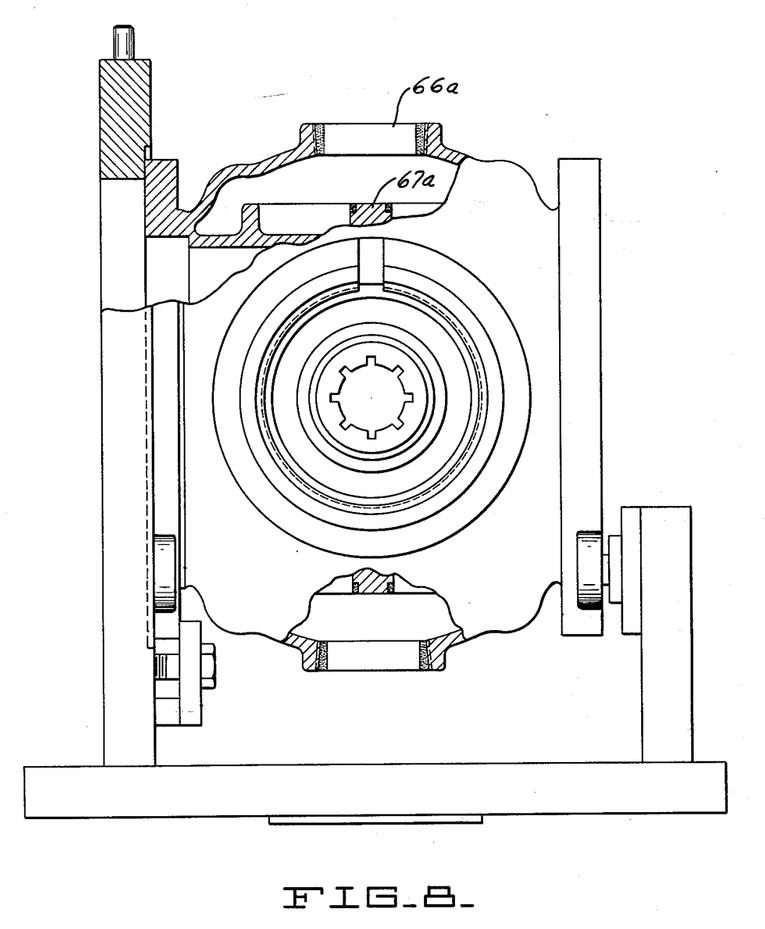
FIGURE 8 is a side elevational view like FIGURE 6 but with the casting rotated 90° about a horizontal axis, and indicating further machining operations.
Figure 9:
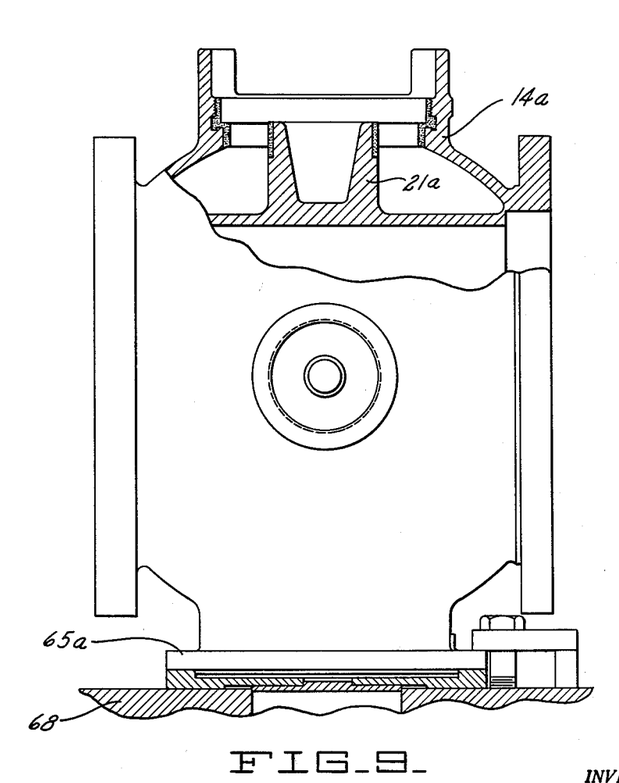
FIGURE 9 is a view like FIGURE 8 but rotated through a further angle of 90° to bring the bottom of the casting uppermost, and also showing further machining operations.
Figure 10:
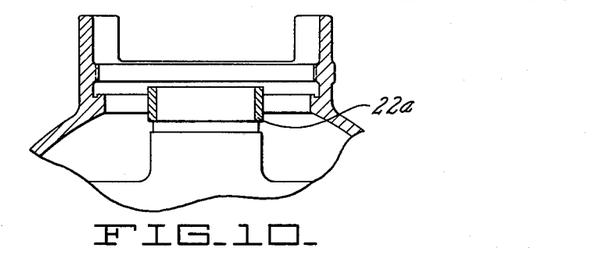
FIGURE 10 is a detail in section illustrating the upper part of the casting after the machining operations indicated in FIGURE 9, and with a journal bushing being applied to the ball.
Figure 11:
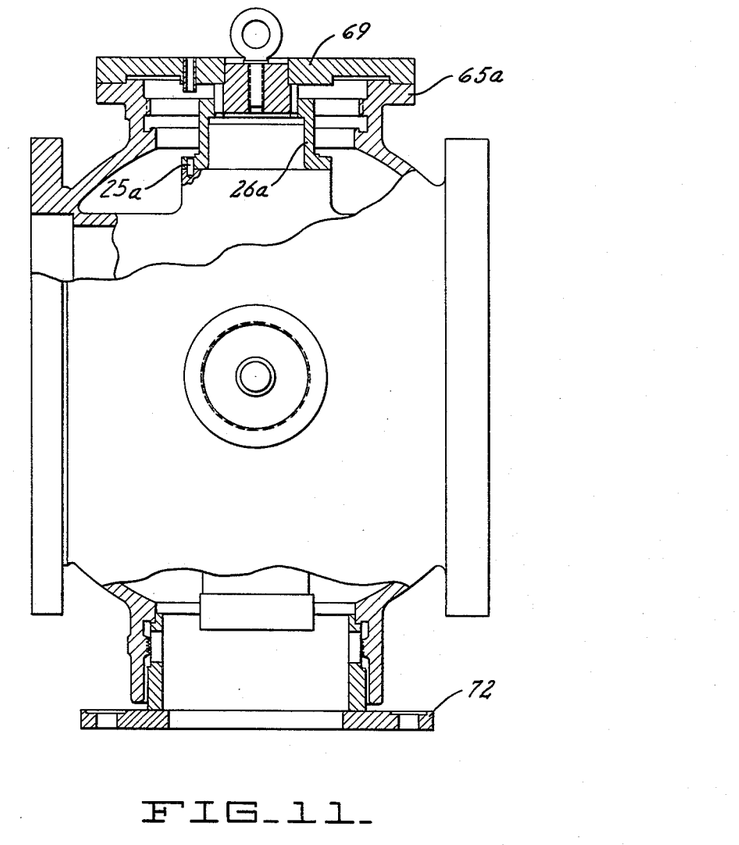
FIGURE 11 is a side elevational view in section illustrating the casting after the machining operations indicated in FIGURES 5–10 and with jigs applied to the upper and lower ends for further machining operations.

Following the operations indicated in FIGURE 8, the assembly is removed from the jig 64 and is clamped to the work table 68 in the manner shown in FIGURE 9. The bottom of the assembly is now uppermost. Machining operations are now carried out upon the body 14a, and upon the stud portion 21a, as indicated by the shaded areas. Then the journal bushing 22a is installed as shown in FIGURE 10. Thereafter the assembly is inverted to the position shown in FIGURE 11, and a drilling jig 69 may be applied to the flange portion 65a, and to the drive sleeve 26a. With this jig various holes can be accurately drilled, including the bolt holes for the flange portion 65a, and the holes for dowels 25a which prevent rotation of the drive sleeve 26a with respect to the ball. At this time the assembly may rest upon the fixture 72.

Figure 12:
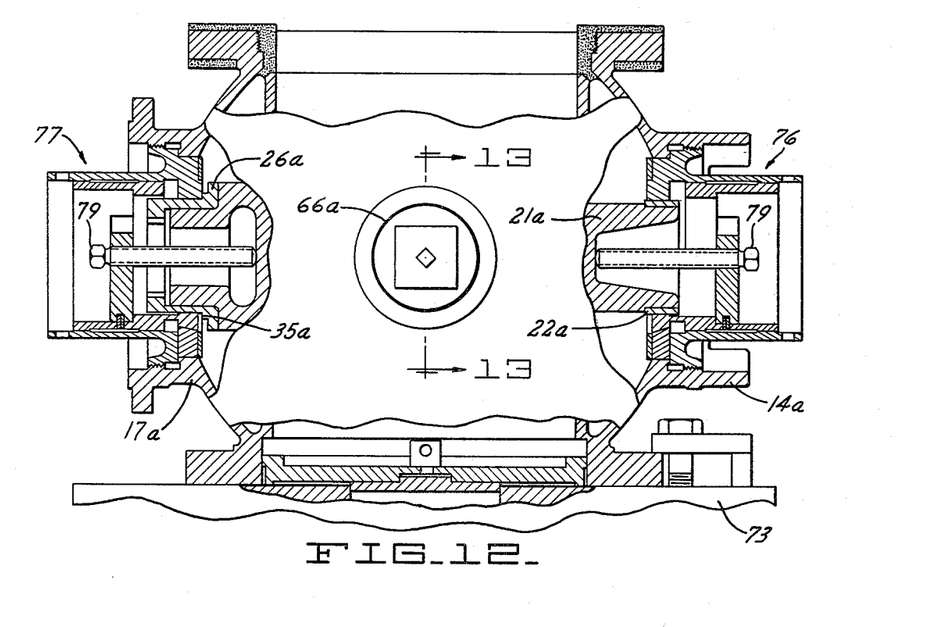
FIGURE 12 is a side elevational view partly in section with the axis of the flow passage vertical and showing fixtures applied to fix the ball part to the body, and indicating further machining operations.
Figure 13:
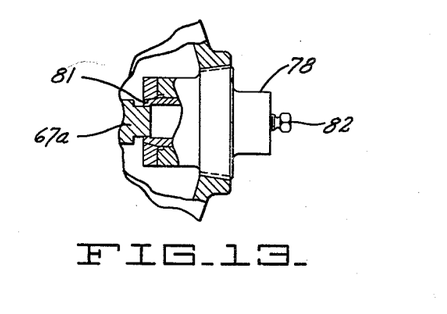
FIGURE 13 is a cross sectional detail taken along the line 13—13 of FIGURE 12.

As shown in FIGURE 12 the assembly is now clamped to a work table 73, and the fixtures 76 and 77 are applied to the journal bushing 22a and the drive sleeve 26a, to provide rigid attachments between these parts and the adjacent portions of the body. Similarly a fitting 78 is threaded into the opening 66a, and serves to form a rigid connection between the stud 67a and the adjacent portion of the body.

It will be evident that the fittings just mentioned (76, 77 and 78) may vary in construction, provided they afford the desired rigid connections between the ball and the body during the subsequent machining operations which serve to sever the ball from the body. In the constructions illustrated, each of the fittings 76 and 77 consist of bodies that are threaded into the body portions 14a and 17a, and which snugly embrace the journal bushing 22a and the drive sleeve 26a. In addition each fitting is shown provided with a screw 79 which is advanced to engage the ball, and which serves to prevent any movement of the ball in a direction axially of the fittings 76 and 77.

The fitting 78 may be in the form of a chuck with a portion threaded within the axis opening 66a, and with a chuck-like means 81 which is operated by the screw 82, and which serves to grip the corresponding machined stud 67a.

Figure 14:
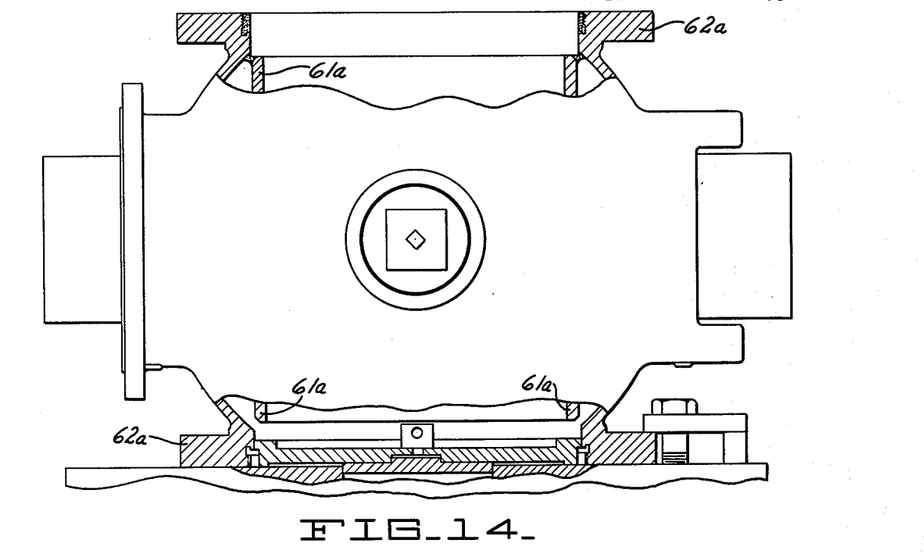
FIGURE 14 is a side elevational view similar to FIGURE 12 and indicating machining operations for severing the body and ball parts.

As indicated in FIGURE 14, the next operation is to complete machining of the uppermost flange portion 62a by removal of the shaded areas, and by machining, to sever this portion of the body from the adjacent annular portion 61a of the ball. In this figure it is assumed that such machining operations have been completed upon the lower end of the assembly, but are in progress for the upper part of the assembly.

Figure 15:
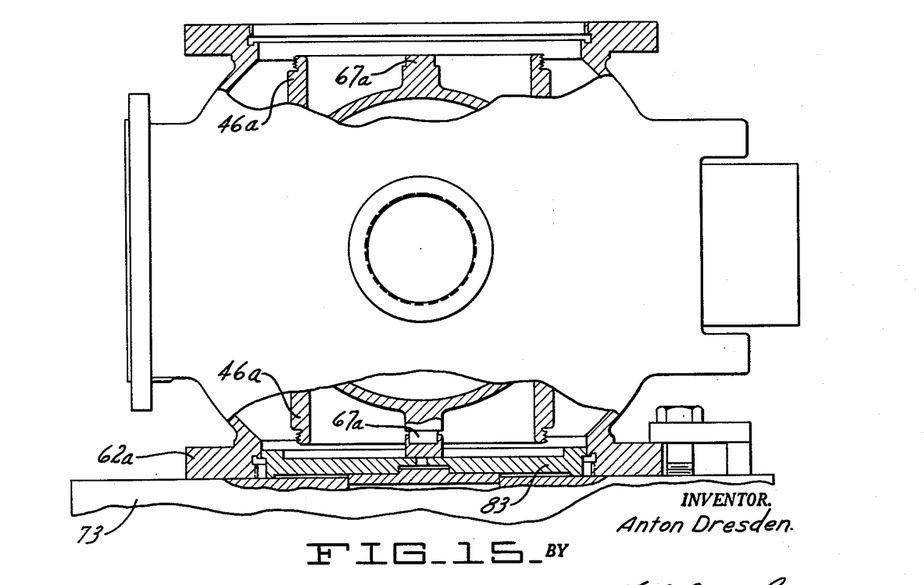
FIGURE 15 is a view like FIGURE 14 but illustrating the ball part having been turned 90°, and also indicating further machining operations.

After completing the machining operations indicated in FIGURE 14, the inner ball has been completely severed from its integral connection with the body, and it is now turned 90° about the axis of the fittings 76 and 77, after loosening the clamping screws 79. To permit such turning movement it is necessary to remove the fitting 78. In the new position of the ball, a rigid connection is established between the fitting 83, which is within the flange portion 62a of the body, and the lowermost one of the two studs 67a. Fittings 76 and 77 are so made that by tightening first the screw 79 of fitting 76, the valve member is moved toward the fiitting 77 until the thrust face 35a contacts fitting 77. This positions the valve member in the same relative position to the body as in FIGURE 1. Further tightening of the screw 79 of fitting 76 clamps the journal bushing 22a and the body portion 14a. Subsequent tightening of screw 79 on fixture 77 clamps drive sleeve 26a and the body portion 17a. Thereafter machining operations are carried out upon the annular portions 46a of the ball, starting first with the upper end of the assembly and then inverting the assembly for completing the other end.

After completing the various machining operations described above, it may be necessary to perform minor machine operations on the body, such as the drilling of bolt holes, etc. Suitable drilling fixtures can be used for this purpose. The fittings 76 and 77 may remain installed upon the assembly until it is desired to factory assemble the valve, at which time such fittings are removed as the trunnion members are applied.

It will be evident that the method of manufacture described above has many advantages. For a given size of valve and pressure rating, the casting forming the body can be considerably lighter than conventional ball valve constructions, and likewise there is a substantial saving in weight for the completed valve. The machining operations are not difficult and in general are simpler and less expensive than conventional constructions. Final assembly is relatively simple, particularly because assembly starts with the ball disposed within the body. Machining the ball simultaneously with the machine operations on the body, and with the ball within the body, greatly facilitates accuracy and proper alignment of the ball and sealing means after the trunnions are installed. The body actually forms a part of a jig during the ball machining operations.

This application is a continuation-in-part of my co-pending application Serial No. 613,118, filed October 1, 1956, entitled "Valve Construction and Method."

I claim:

1. In a method for the manufacture of a valve, said valve including outer body and inner valve parts, the steps of forming a single casting comprising the two parts integrally joined, the body being formed to generally embrace the inner valve part, the casting having an opening extending through both parts from one side of the casting to the other, there being annular wall portions on opposite sides of the inner valve part serving to define portions of said opening and integrally joined to the body part, said inner valve part also having portions on the ends of the same adapted to form trunnions for the valve part, performing machining operations on said last named portions of the valve part and the adjacent portions of the body, applying fittings to such machined portions to fix the valve part relative to the body independently of said integral junctions, and then performing machining operations to separate the valve part from the body.

2. A method as in claim 1 in which, after carrying out machining operations to separate the valve part from the body, the valve part is rotated and then again fixed relative to the body, and thereafter machining operations carried out on opposite sides of the valve part for the mounting of seal members thereon.

3. In a method for the manufacture of a valve of the type having an outer body and an inner valve part that is rotatable between open and closed positions, said valve including outer body and inner valve parts, the steps of forming a single casting comprising the two parts integrally joined together, there being annular wall portions on opposite sides of the inner part embracing a port that extends through the valve part, the annular portions being integrally joined to the body part, said valve part also having axially aligned portions on the ends of the same adapted to form trunnions, machining said last named portions of the valve part and the adjacent portions of the body concentric with said axis, applying fittings to such machined portions to fix the position of the valve part relative to the body part independently of said annular wall portions, machining said annular wall portions to sever the same and thereby to separate the inner valve part from the body, rotating the valve part 90° with respect to the body about said axis, then again fixing the valve part relative to the body part, and thereafter carrying out machining operations on opposite sides of the valve part for the mounting of seal members thereon.

4. In a method for the manufacture of a valve of the type comprising an outer shell-like body having aligned flow passages in opposite sides of the same and an inner valve part that is rotatable about an axis perpendicular to the axis of the flow passages, the steps of forming a single casting comprising outer body and inner valve parts integrally joined together, the junction between said parts comprising at least one annular wall portion that integrally connects a side portion of the valve part to the body part, said annular wall portion being aligned with a flow passage in the body part, said valve part also having portions on the ends of the same adapted to form trunnions for the valve part, performing machining operations on said last named portions of the valve part and the adjacent portions of the body, applying fittings to such machined portions to fix the positions of the valve part relative to the body part independently of said integral junction, and then performing machining operations on said annular wall portion to sever the same.

5. In a method for the manufacture of a valve of the ball type, the steps of forming a single metal casting comprising both outer body and inner valve ball parts, the outer body part being formed to generally embrace the inner valve ball part, the casting having an opening extending through both parts from one side of the casting to the other, the inner valve part including annular portions on opposite sides of the same serving to define portions of said opening, said annular portions being integrally joined with the outer body part, applying means to hold the inner ball part rigid with respect to the body part, and thereafter separating the two parts by machining said annular portions while the inner ball part is being so held.

References Cited in the file of this patent

UNITED STATES PATENTS

| | | |
|---|---|---|
| 1,800,908 | Schnyder | Apr. 14, 1931 |
| 2,184,183 | Fykse | Dec. 19, 1939 |
| 2,263,907 | Stanton | Nov. 25, 1941 |
| 2,482,873 | Roberts | Sept. 27, 1949 |
| 2,505,270 | Allen | Apr. 25, 1950 |
| 2,573,177 | Bohlen | Oct. 30, 1951 |
| 2,663,538 | Bacchi | Dec. 22, 1953 |
| 2,665,879 | Housekeeper | Jan. 12, 1954 |
| 2,669,011 | Brumbaugh | Feb. 16, 1954 |
| 2,685,889 | Leighton | Aug. 10, 1954 |
| 2,764,804 | Arness | Oct. 2, 1956 |
| 2,809,011 | Davis | Oct. 8, 1957 |
| 2,819,868 | Cauffman | Jan. 14, 1958 |
| 2,857,130 | Brisbane | Oct. 21, 1958 |
| 2,960,760 | Woolf | Nov. 22, 1960 |
| 3,008,685 | Rudden | Nov. 14, 1961 |

FOREIGN PATENTS

| | | |
|---|---|---|
| 1,001,843 | France | Oct. 24, 1951 |
| 191,051 | Germany | Nov. 13, 1907 |